(12) United States Patent
Patel

(10) Patent No.: US 9,866,368 B1
(45) Date of Patent: Jan. 9, 2018

(54) METHOD AND APPARATUS FOR TIME TRACKING IN OFDM WIRELESS COMMUNICATION SYSTEMS

(71) Applicant: MBIT WIRELESS, INC., Irvine, CA (US)

(72) Inventor: Bhaskar Patel, San Clemente, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 134 days.

(21) Appl. No.: 15/059,437

(22) Filed: Mar. 3, 2016

(51) Int. Cl.
*H04W 4/00* (2009.01)
*H04L 7/00* (2006.01)
*H04L 5/00* (2006.01)
*H04W 72/04* (2009.01)

(52) U.S. Cl.
CPC .......... *H04L 7/0025* (2013.01); *H04L 5/0007* (2013.01); *H04W 72/0446* (2013.01)

(58) Field of Classification Search
CPC . H04L 7/0025; H04L 5/0007; H04W 72/0446
See application file for complete search history.

(56) References Cited

U.S. PATENT DOCUMENTS

| 9,277,519 | B1* | 3/2016 | Pu | H04W 56/005 |
| 2007/0153926 | A1* | 7/2007 | Arslan | H04L 25/022 |
| | | | | 375/260 |
| 2015/0263813 | A1* | 9/2015 | Gorshtein | H04B 10/6166 |
| | | | | 398/115 |

OTHER PUBLICATIONS

Vaidyanathan, P. P., "Multirate Systems and Filter Banks," Prentice Hall (1993) pp. 120-125.

* cited by examiner

*Primary Examiner* — Afshawn Towfighi
(74) *Attorney, Agent, or Firm* — Lerner, David, Littenberg, Krumholz & Mentlik, LLP

(57) ABSTRACT

In a mobile wireless communication system a client terminal needs to continuously maintain its receive and transmit operations in time alignment with the serving base station timing. A client terminal may initially achieve the timing alignment with the serving base station through the cell search procedure. Subsequently, as a client terminal may move toward or away from a serving base station, it may need to continuously track its timing to remain time aligned with the serving base station. In Orthogonal Frequency Division Multiplexing (OFDM) systems, one of the commonly used methods for time tracking may be the Cyclic Prefix (CP) correlation. When the length of the CP is small, the reliability of the CP correlation may be low, especially when the signal quality is poor. A method and apparatus are disclosed that use the initial synchronization signals for time tracking for improved performance and reduced complexity.

20 Claims, 16 Drawing Sheets

METHOD AND APPARATUS FOR TIME TRACKING IN OFDM WIRELESS COMMUNICATION SYSTEMS

BACKGROUND

Typically, as shown in FIG. 1, a wireless communication system 10 comprises elements such as a client terminal or mobile station 12 and base stations 14. Other network devices which may be employed, such as a mobile switching center, are not shown. In some wireless communication systems there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station with which the client terminal is communicating is referred to as the serving base station. In some wireless communication systems the serving base station is normally referred to as the serving cell. While in practice a cell may include one or more base stations, a distinction is not made between a base station and a cell, and such terms may be used interchangeably herein. The base stations that are in the vicinity of the serving base station are called neighbor cell base stations. Similarly, in some wireless communication systems a neighbor base station is normally referred to as a neighbor cell.

Duplexing refers to the ability to provide bidirectional communication in a system, i.e., from base station to client terminals (DL) and from client terminals to base station (UL). There are different methods for providing bidirectional communication. One of the commonly used duplexing methods is Frequency Division Duplexing (FDD). In FDD wireless communication systems, two different frequencies, one for DL and another for UL are used for communication. In FDD wireless communication system, the client terminals may be receiving and transmitting simultaneously.

Another commonly used method is Time Division Duplexing (TDD). In TDD based wireless communication systems, the same exact frequency is used for communication in both DL and UL. In TDD wireless communication systems, the client terminals may be either receiving or transmitting but not both simultaneously. The use of the Radio Frequency (RF) channel for DL and UL may alternate on a periodic basis. For example, in every 5 ms time duration, during the first half, the RF channel may be used for DL and during the second half, the RF channel may be used for UL. In some communication systems the time duration for which the RF channel is used for DL and UL may be adjustable and may be changed dynamically.

Yet another commonly used duplexing method is Half-duplex FDD (H-FDD). In this method, different frequencies are used for DL and UL but the client terminals may not perform receive and transmit operations at the same time. Similar to TDD wireless communication systems, a client terminal using the H-FDD method must periodically switch between DL and UL operation. All three duplexing methods are illustrated in FIG. 2.

In many wireless communication systems, normally the communication between the base station and client terminals is organized into frames as shown in FIG. 3. The frame duration may be different for different communication systems and normally it may be on the order of milliseconds. For a given communication system the frame duration may be fixed. For example, the frame duration may be 10 milliseconds.

In a TDD wireless communication system, a frame may be divided into a DL subframe and a UL subframe. In TDD wireless communication systems, the communication from base station to the client terminal (DL) direction takes place during the DL subframe and the communication from client terminal to network (UL) direction takes place during UL subframe on the same RF channel.

Orthogonal Frequency Division Multiplexing (OFDM) systems typically use a Cyclic Prefix (CP) to combat inter-symbol interference and to maintain the subcarriers orthogonal to each other under a multipath fading propagation environment. The CP is a portion of the sample data that is copied from the tail part of an OFDM symbol to the beginning of the OFDM symbol as shown in FIG. 4. One or more OFDM symbols in sequence as shown in FIG. 4 are referred to herein as an OFDM signal.

In addition to the purposes mentioned above, the CP may often be used for frequency offset estimation at the receiver. Any frequency offset at the receiver relative to the center frequency of the transmitted signal causes the phase of the received signal to change linearly as a function of time. The two parts of an OFDM signal that are identical at the transmitter, i.e., the CP and the tail portion of the OFDM symbol, may undergo different phase change at the receiver due to the frequency offset. Therefore, the frequency offset can be estimated by performing correlation between the CP and the tail portion of an OFDM symbol. The angle of the CP correlation indicates the amount of phase rotation that is accumulated over the duration of an OFDM symbol. This accumulated phase rotation may then used for frequency offset estimation. Let the incoming OFDM signal at a receiver be denoted by z(n) where n is the sample index. As illustrated in FIG. 4, let the length of an OFDM symbol in terms of samples, excluding the CP portion, be denoted by N. Let the length of the CP portion be denoted by L. The CP correlation R(n) at any sample index n may be computed as follows:

$$R_{cp}(n) = \left| \frac{1}{L} \sum_{l=0}^{L-1} z(n-l) \cdot z^*(n-l-N) \right| \quad (1)$$

where z* denotes complex conjugate of z and |•| denotes the absolute value of its argument. Although the CP correlation may be computed for many different sample indices, it is expected to have a large value only for sample indices that correspond to the CP portion of the OFDM symbol. The sample index for the largest CP correlation value over the duration of N+L samples may be considered to be the true OFDM symbol boundary.

In a mobile wireless communication system, a client terminal must continuously maintain its receive and transmit operations in time alignment with that of the serving base station. A client terminal may initially achieve the timing alignment with the serving base station through the cell search procedure. For example, in a 3$^{rd}$ Generation Partnership Project (3GPP) Long Term Evolution (LTE) wireless communication system, the Primary Synchronization Signal (PSS) is used for initial timing acquisition. However, after completing the cell search procedure, the client terminal may continuously track its timing to remain time aligned with the serving base station as it may move toward or away from the serving base station. The time tracking may also be required due to frequency offset that may be present between the client terminal and the base station.

In OFDM systems, one of the commonly used methods for estimating the timing offset between a client terminal and the base station may be the CP correlation. The position of the largest CP correlation may be used as an indicator of the expected true timing position. Since the largest CP correlation position for an individual OFDM symbol may not be reliable due to noise and interference, the timing positions estimated from a number of OFDM symbols may be filtered before being used for any adjustment in the time tracking.

In wireless communication system deployments where frequency reuse is employed, the signals from several base stations may be superimposed. In some cases, the various base stations may not be time synchronized, i.e., the OFDM symbol boundaries for the different cells may not be time aligned. Even if the OFDM symbol boundaries are time aligned at the base stations, the propagation delays from different base stations to the client terminal may be different and therefore the OFDM symbol timing may not be time aligned at the client terminal receiver. Furthermore, in some wireless communication systems, such as 3GPP LTE or LTE-Advanced wireless communication systems, an option of using different CP lengths exists and the exact CP in use by neighbor base cells may not be known a priori to the client terminal. The overall received signal scenario is illustrated in FIG. 5. Under these types of scenarios, the time tracking based on CP correlation may not be reliable because of interference from neighbor cells. Also, the largest CP correlation position may correspond to the timing of a possibly stronger neighbor cell rather than that of the serving cell. This may lead a client terminal to track neighbor cell timing instead of serving cell timing. This may quickly lead to loss of communication between a client terminal and the serving base station. The problem arises because the CP correlation is common to all the cells that are transmitting OFDM signals; it is not specific to any particular cell. This makes it difficult to differentiate between the CP correlations of signals from two different cells.

The 3GPP LTE wireless communication system supports six different channel bandwidths starting from 1.4 MHz to 20 MHz. The sample rate typically used for the lowest channel bandwidth may be 1.92 Msps whereas for the highest channel bandwidth may be 30.72 Msps. In order to support all the different channel bandwidths, a client terminal may implement its internal logic using the sample clock required for the highest channel bandwidth. This may allow the client terminal to control various internal timing and other events in a unified manner. For example, all the timings in a 3GPP LTE wireless communication system may be derived from the basic clock of 30.72 MHz, which is related to the highest channel bandwidth and the subcarrier spacing. Also, the timing requirements for the uplink transmissions are in units of Ts=1/30.72 Msps≈32.55 ns.

For the case of time tracking, the CP correlation may be performed at the sample rate of the incoming signal which is 30.72 Msps for the case of 20 MHz channel bandwidth. The largest CP correlation position in this case provides the timing position estimate with a resolution of one Ts. As shown in FIG. 6, although the Normal CP duration is the same for both the smallest channel bandwidth and the largest channel bandwidth, the maximum number of samples in that duration for the highest channel bandwidth may be 160. The CP correlation for largest channel bandwidth may provide a reasonably accurate estimate for the timing position. However, for the lowest bandwidth case the maximum number of samples in the CP portion may be 10 and therefore the timing position estimate may not be reliable. The timing position estimates using a CP correlation for a 1.4 MHz channel bandwidth can only be accurate within 16*Ts since the sample rate for 1.4 MHz is 16 times slower than the samples rate for 20 MHz channel bandwidth. This in turn may lead to increased timing error.

When the length of the CP is small, the reliability of the largest CP correlation position may be low. This may be especially true when the signal quality is poor due to fading and interference. For example, in a 3GPP LTE wireless communication system when the channel bandwidth is 1.4 MHz, the CP length in terms of samples is only 9 or 10 samples. The CP correlation over only 9 or 10 samples may produce an unreliable estimate of the true timing position of the client terminal relative to the incoming signal from the base station. Furthermore, the estimated timing error may be generally in units of the sample rate of the incoming signal. For the case of 1.4 MHz bandwidth in a 3GPP LTE wireless communication system, the sample rate may be 1.92 Msps. At this sample rate, each sample duration is 1/1.92 MHz≈0.5 μs. The CP duration in terms of time may be on the order of about 5 μs for Normal CP in the case of a 3GPP LTE wireless communication system. A timing error of a few samples at 1.92 Msps leads to an error on the order of few microseconds which becomes a significant portion of the CP duration. For example, an error of five samples may be equivalent to half of the Normal CP duration. During system design the CP duration is generally chosen based on the need to handle the expected delay spread in a particular application. Therefore, not maintaining accurate timing may lead to a reduced budget being available for handling delay spread in a system. Therefore, it is essential for the client terminal receiver to maintain precise timing with the base station signal and minimize any loss in the delay spread budget of the system and the reduced performance due to lack of accurate synchronization.

SUMMARY

A method and apparatus are disclosed that use the initial synchronization signals for time tracking for improved performance and reduced complexity. In accordance with an aspect of the present disclosure, a method may be for time tracking at a client device being served by a base station in an Orthogonal Frequency Division Multiplexing (OFDM) wireless communication system. The method may include controlling, by a processing device, for each of at least one interval of a received signal, filtering the received signal to obtain a filtered signal having a bandwidth corresponding to a predetermined central bandwidth, in which the filtered signal corresponds to a bandwidth of a Primary Synchronization Signal (PSS) and a bandwidth of a Secondary Synchronization Signal (SSS) of the received signal, and in which a sampling rate of the filtered signal is according to a bandwidth of the received signal, a sampling rate of the received signal and a predetermined estimation accuracy for timing error; first cross-correlation processing of the filtered signal and a time domain replica of the PSS of the serving base station having a sampling rate of the received signal, to obtain a first cross-correlation output signal; second cross-correlation processing of the filtered signal and a time domain replica of a SSS of the serving base station having the sampling rate of the received signal, to obtain a second cross-correlation output signal; combining the first and second cross-correlation output signals to obtain a plurality of combined cross-correlation values; and when the bandwidth of the received signal is not less than a predetermined bandwidth, estimating a timing error from a position of a maximum of the combined cross-correlation values, and when the bandwidth of the received signal is less than a predetermined bandwidth, performing interpolation on the combined cross-correlation values to obtain interpolated cross-correlation values and estimating the timing error from a position of a maximum of the combined cross-correlation values and the interpolated cross-correlation values.

In one alternative, the time domain replica of the PSS and the time domain replica of the SSS may be stored in a memory of the client device.

In one alternative, the sampling rate of the filtered signal may be less than the sampling rate of the received signal.

In one alternative, the time domain replica of the SSS may be a time domain replica of a first SSS or a time domain replica of a second SSS of the serving base station.

In one alternative, the first cross-correlation processing of the filtered signal and the time domain replica of the PSS of the serving base station may be performed only around an expected position of the PSS in the received signal for the serving base station.

In one alternative, the first cross-correlation processing of the filtered signal and the time domain replica of the PSS of the serving base station may be performed only at a time instant at which the PSS is transmitted by the serving base station.

In one alternative, the second cross-correlation processing of the filtered signal and the time domain replica of the SSS of the serving base station may be performed only around an expected position of the SSS for the serving base station, and the time domain replica of the SSS may be a time down replica of a first SSS or a time domain replica of a second SSS of the serving base station.

In one alternative, the second cross-correlation processing of the filtered signal and the time domain replica of the SSS of the serving base station may be performed only at a time instant at which the first SSS or the second SSS as the SSS is transmitted by the serving base station.

In one alternative, the combined cross-correlation values may include a single set of correlation values for each time offset around (i) a first nominal position for which the first cross-correlation processing of the filtered signal and the time domain replica of the PSS of the serving base station is performed and (ii) a second nominal position for which the second cross-correlation processing of the filtered signal and the time domain replica of the SSS of the serving base station is performed.

In one alternative, the at least one interval may be a 5 ms interval and the wireless communication system may be a $3^{rd}$ Generation Partnership Project (3GPP) Long Term Evolution (LTE) wireless communication system In one alternative, the at least one interval may include a plurality intervals, and the method may further include estimating a final timing error by determining an average of the timing errors estimated respectively for the plurality of intervals.

In one alternative, the filtering of the received signal may retain only sixty-three central subcarriers, and the predetermined central bandwidth may be 945 kHz.

In one alternative, the sampling rate of the filtered signal may be the same as the sampling rate of the received signal.

In one alternative, the interpolation may be performed in accordance with the bandwidth of the received signal and a predetermined desired error granularity for the time tracking.

In one alternative, the filtering of the received signal and the interpolation may be performed by a single filter.

In one alternative, the method may be performed for each PSS and SSS occurrence in the received signal or based on a determination of need for speed and accuracy of the time tracking.

In accordance with an aspect of the present disclosure, an apparatus may be for time tracking at a client device being served by a base station in an Orthogonal Frequency Division Multiplexing (OFDM) wireless communication system. The apparatus may include circuitry configured to control, for each of at least one interval of a received signal, filtering the received signal to obtain a filtered signal having a bandwidth corresponding to a predetermined central bandwidth, in which the filtered signal corresponds to a bandwidth of a Primary Synchronization Signal (PSS) and a bandwidth of a Secondary Synchronization Signal (SSS) of the received signal, and in which a sampling rate of the filtered signal is according to a bandwidth of the received signal, a sampling rate of the received signal and a predetermined estimation accuracy for timing error; first cross-correlation processing of the filtered signal and a time domain replica of the PSS of the serving base station having a sampling rate of the received signal, to obtain a first cross-correlation output signal; second cross-correlation processing of the filtered signal and a time domain replica of a SSS of the serving base station having the sampling rate of the received signal, to obtain a second cross-correlation output signal; combining the first and second cross-correlation output signals to obtain a plurality of combined cross-correlation values; and when the bandwidth of the received signal is not less than a predetermined bandwidth, estimating a timing error from a position of a maximum of the combined cross-correlation values, and when the bandwidth of the received signal is less than a predetermined bandwidth, performing interpolation on the combined cross-correlation values to obtain interpolated cross-correlation values and estimating the timing error from a position of a maximum of the combined cross-correlation values and the interpolated cross-correlation values.

In one alternative of the apparatus, the first cross-correlation processing of the filtered signal and the time domain replica of the PSS of the serving base station may be performed only around an expected position of the PSS in the received signal for the serving base station.

In accordance with an aspect of the present disclosure, a communication device may include a receiver to receive a signal; and a processing device for time tracking at a client device being served by a base station in an Orthogonal Frequency Division Multiplexing (OFDM) wireless communication system. The processing device may be configured to control, for each of at least one interval of a received signal, filtering the received signal to obtain a filtered signal having a bandwidth corresponding to a predetermined central bandwidth, in which the filtered signal corresponds to a bandwidth of a Primary Synchronization Signal (PSS) and a bandwidth of a Secondary Synchronization Signal (SSS) of the received signal, and in which a sampling rate of the filtered signal is according to a bandwidth of the received signal, a sampling rate of the received signal and a predetermined estimation accuracy for timing error; first cross-correlation processing of the filtered signal and a time domain replica of the PSS of the serving base station having a sampling rate of the received signal, to obtain a first cross-correlation output signal; second cross-correlation processing of the filtered signal and a time domain replica of a SSS of the serving base station having the sampling rate of the received signal, to obtain a second cross-correlation output signal; combining the first and second cross-correlation output signals to obtain a plurality of combined cross-correlation values; and when the bandwidth of the received signal is not less than a predetermined bandwidth, estimating a timing error from a position of a maximum of the combined cross-correlation values, and when the bandwidth of the received signal is less than a predetermined bandwidth, performing interpolation on the combined cross-correlation values to obtain interpolated cross-correlation values and estimating the timing error from a position of a maximum of the combined cross-correlation values and the interpolated cross-correlation values.

In one alternative of the communication device, the first cross-correlation processing of the filtered signal and the time domain replica of the PSS of the serving base station may be performed only around an expected position of the PSS in the received signal for the serving base station.

DETAILED DESCRIPTION

Figure 1:
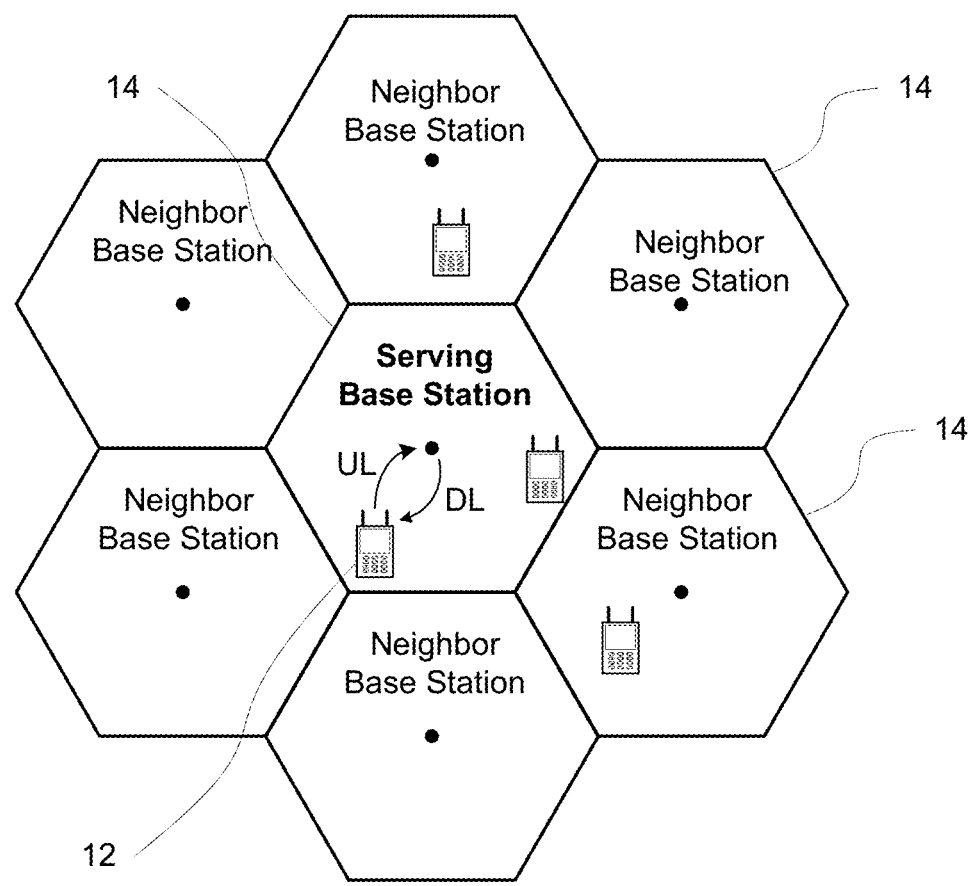
FIG. 1 illustrates a conventional wireless cellular communication system.
Figure 2:
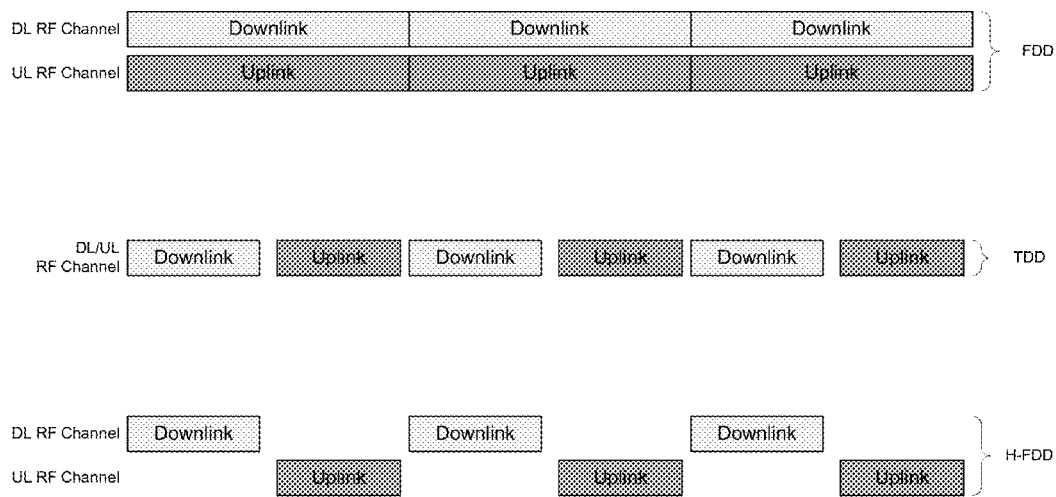
FIG. 2 illustrates FDD, TDD and H-FDD duplexing techniques.
Figure 3:
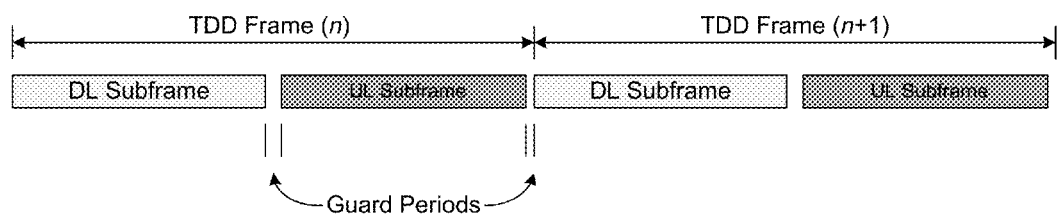
FIG. 3 illustrates a TDD frame consisting of DL portions and UL portions.
Figure 4:
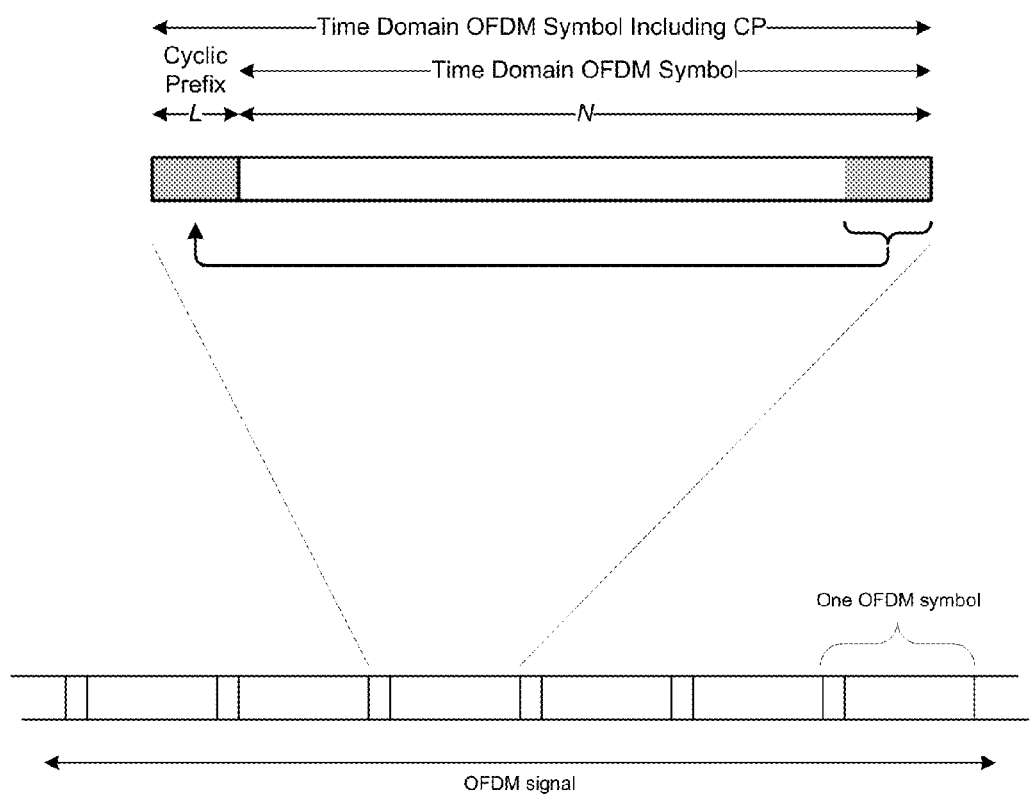
FIG. 4 illustrates an OFDM symbol with Cyclic Prefix Insertion.
Figure 5:
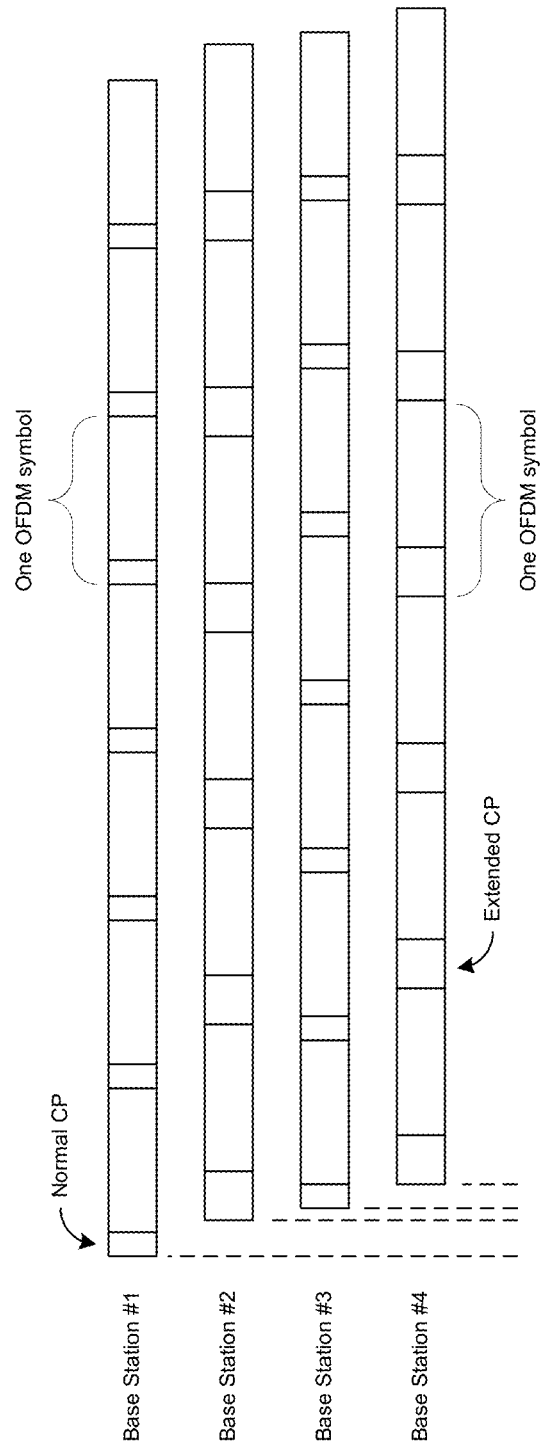
FIG. 5 illustrates OFDM signals from a set of base stations that are not time synchronized and using different CP lengths.
Figure 6:
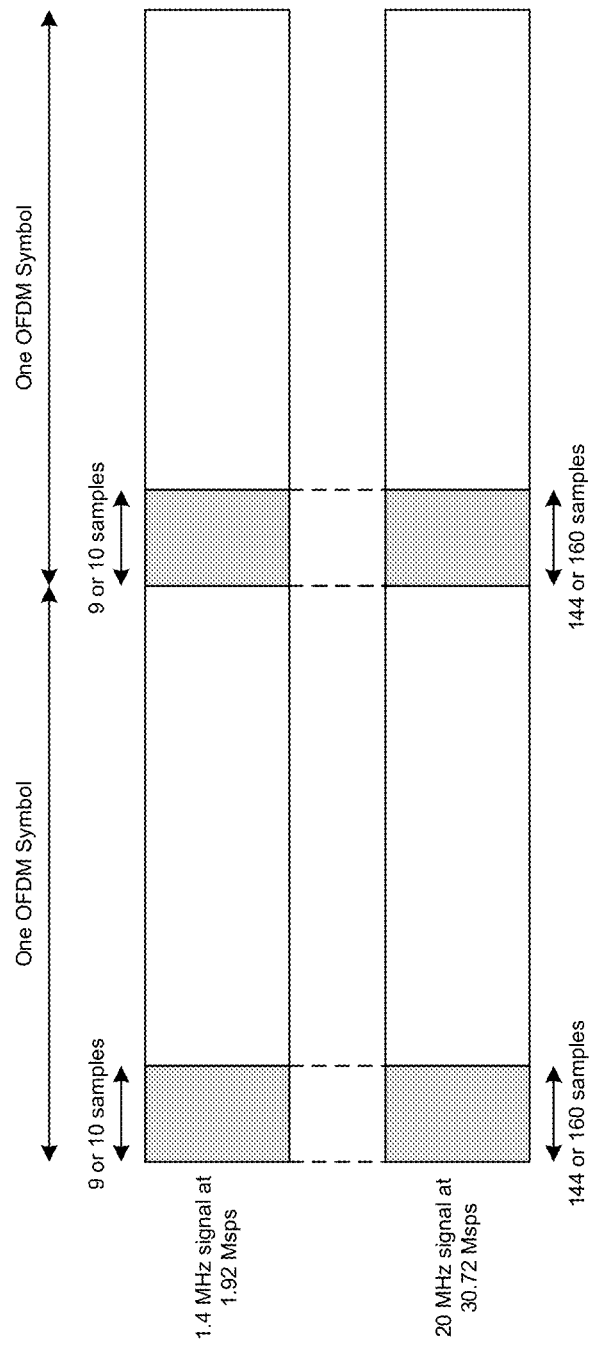
FIG. 6 illustrates OFDM signals with different bandwidth, sampling rates and corresponding different number of samples in CP portion.

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

Figure 7:
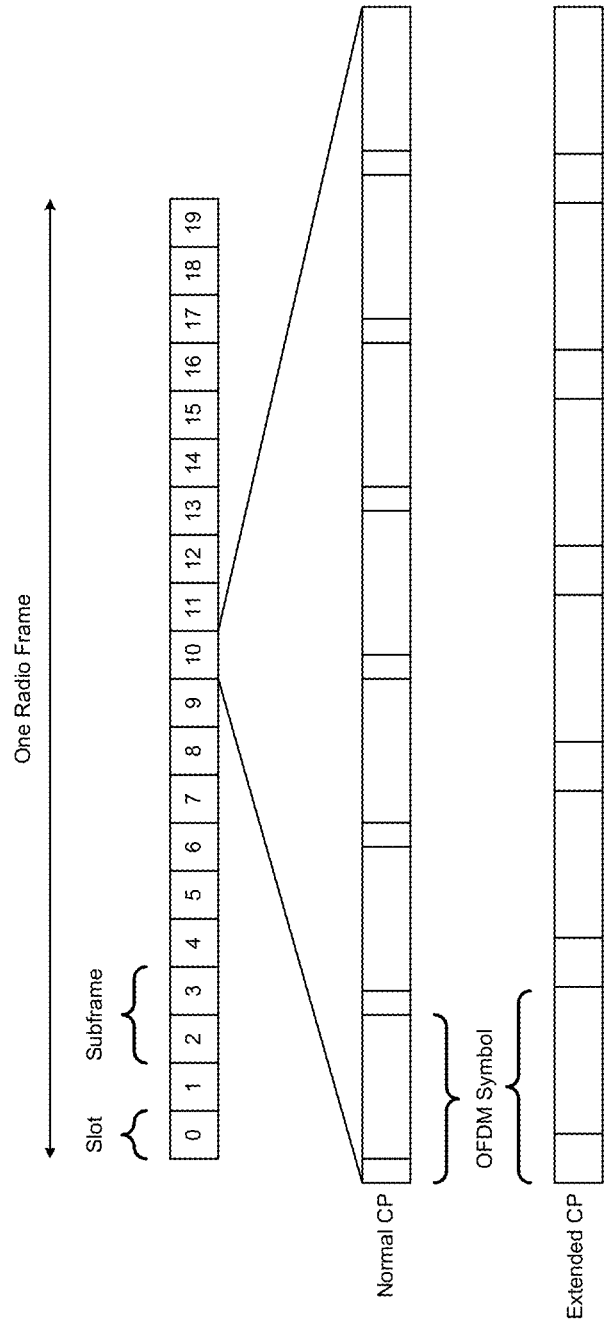
FIG. 7 illustrates the frame structure of the air interface of the 3GPP LTE wireless communication system.

Most wireless communication systems may organize the air interface in small units of time. For example, 10 ms radio frames are used in 3GPP LTE wireless communication systems and each radio frame comprises 10 subframes as shown in FIG. 7. Each subframe in turn consists of two slots and each slot consists of 6 or 7 OFDM symbols depending on the type of CP used as shown in FIG. 7. In the 3GPP LTE wireless communication system, two different CP lengths are used and they are referred to as Normal CP and Extended CP. In wireless communication systems, normally the specific air interface frame structure repeats itself over certain periodicity. In the 3GPP LTE wireless communication system, the CP length of the first OFDM symbol in each slot may be longer for Normal CP type to ensure that each slot is of exactly 0.5 ms duration. This in turn may lead to a different number of samples in CP duration for the first OFDM symbol and the rest of the OFDM symbols in a slot in case of Normal CP. For example, for the case of a 20 MHz channel bandwidth and a sampling rate of 30.72 Msps, the number of samples in the CP of the first OFDM symbol may be 160 and for the rest of the OFDM symbols in a slot it may be 144. Similarly, for the case of a 1.4 MHz channel bandwidth and a sampling rate of 1.92 Msps, the number of samples in the CP of the first OFDM symbol may be 10 and for the rest of the OFDM symbols in a slot it may be 9.

The 3GPP LTE wireless communication system uses the following synchronization signals to assist the client terminal in achieving time and frequency synchronization as well as the detection of physical layer cell identity:

Primary Synchronization Signal (PSS)
Secondary Synchronization Signal (SSS)

Figure 8:
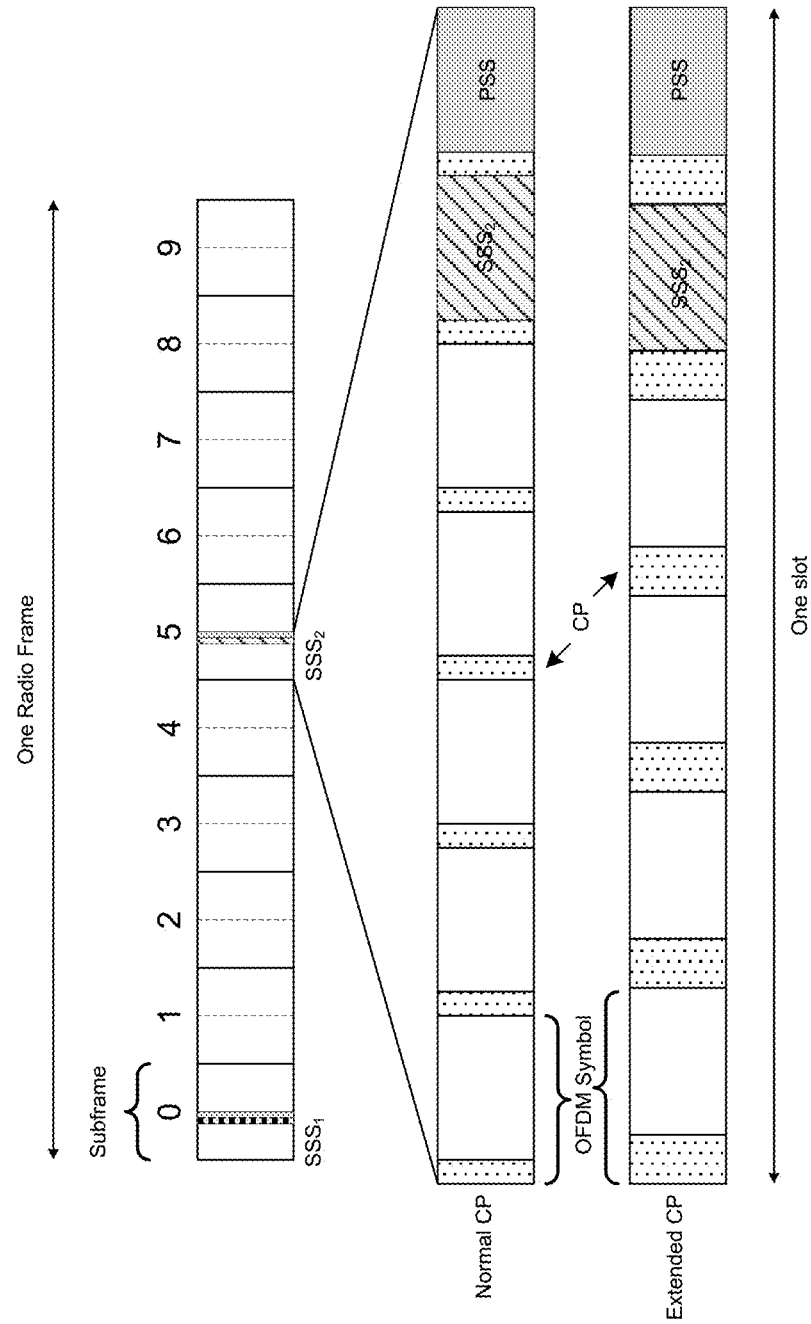
FIG. 8 illustrates the locations of a Primary Synchronization Signal (PSS) and a Secondary Synchronization Signal (SSS) for Normal CP and Extended CP in the case of a FDD 3GPP LTE wireless communication system.
Figure 9:
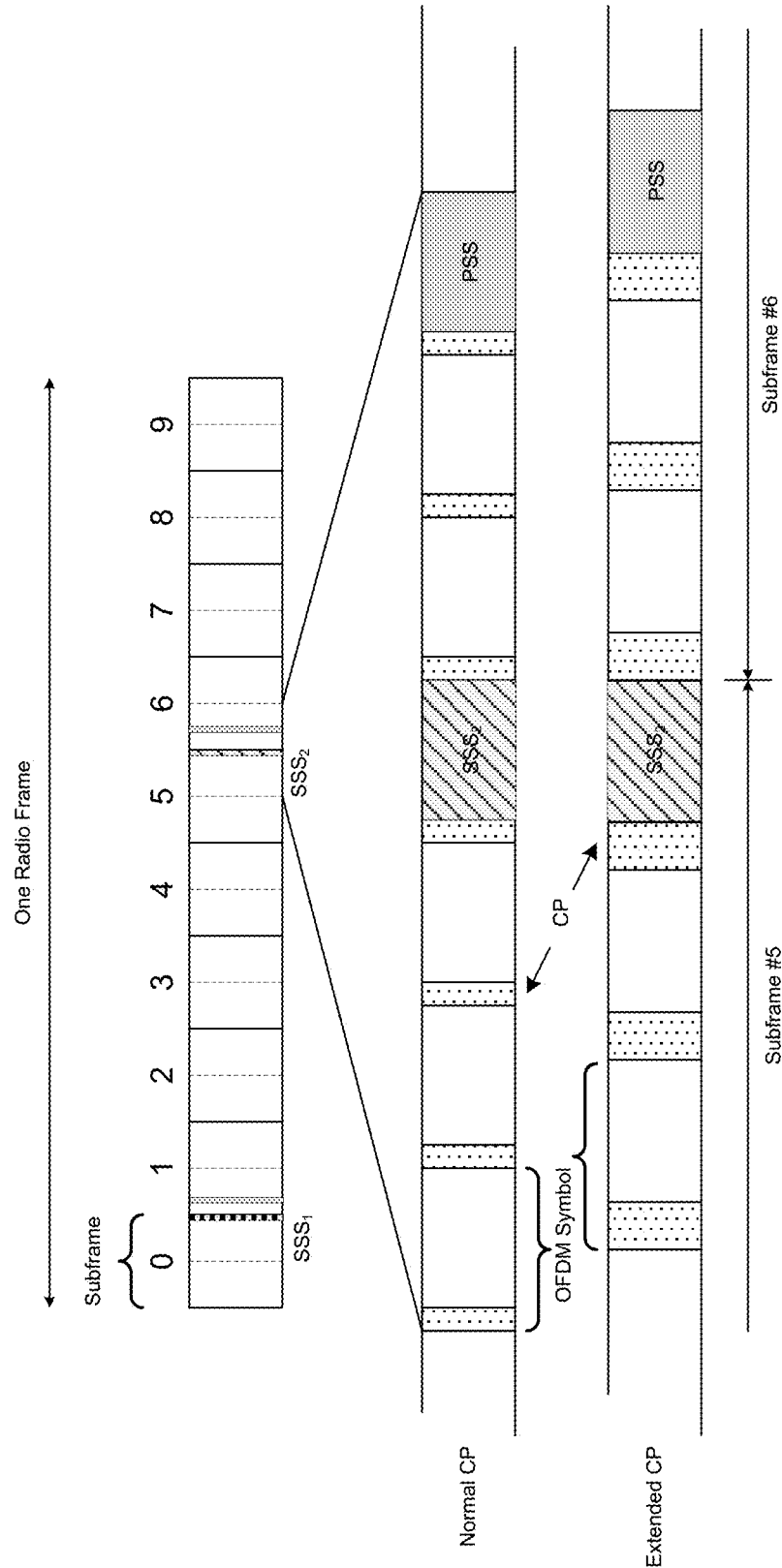
FIG. 9 illustrates the locations of a PSS and a SSS for Normal CP and Extended CP in the case of a TDD 3GPP LTE wireless communication system.

The positions of the PSS and SSS are illustrated in FIG. 8 for FDD air-interface of a 3GPP LTE wireless communication system. Note that the figure shows the position of the PSS and SSS for both the Normal CP and Extended CP. FIG. 9 illustrates the PSS and SSS positions for TDD air-interface of a 3GPP LTE wireless communication system. The PSS and SSS for different cells may be different as described below.

The different PSS and SSS are identified by different signal sequences used for transmission. Specifically, 504 physical cell identities are defined in 3GPP LTE wireless communication system specifications and they are organized into 168 groups with three identities in each group. The SSS sequence identifies the physical cell identity group and PSS sequence identifies the physical cell identity within a group.

Figure 10:
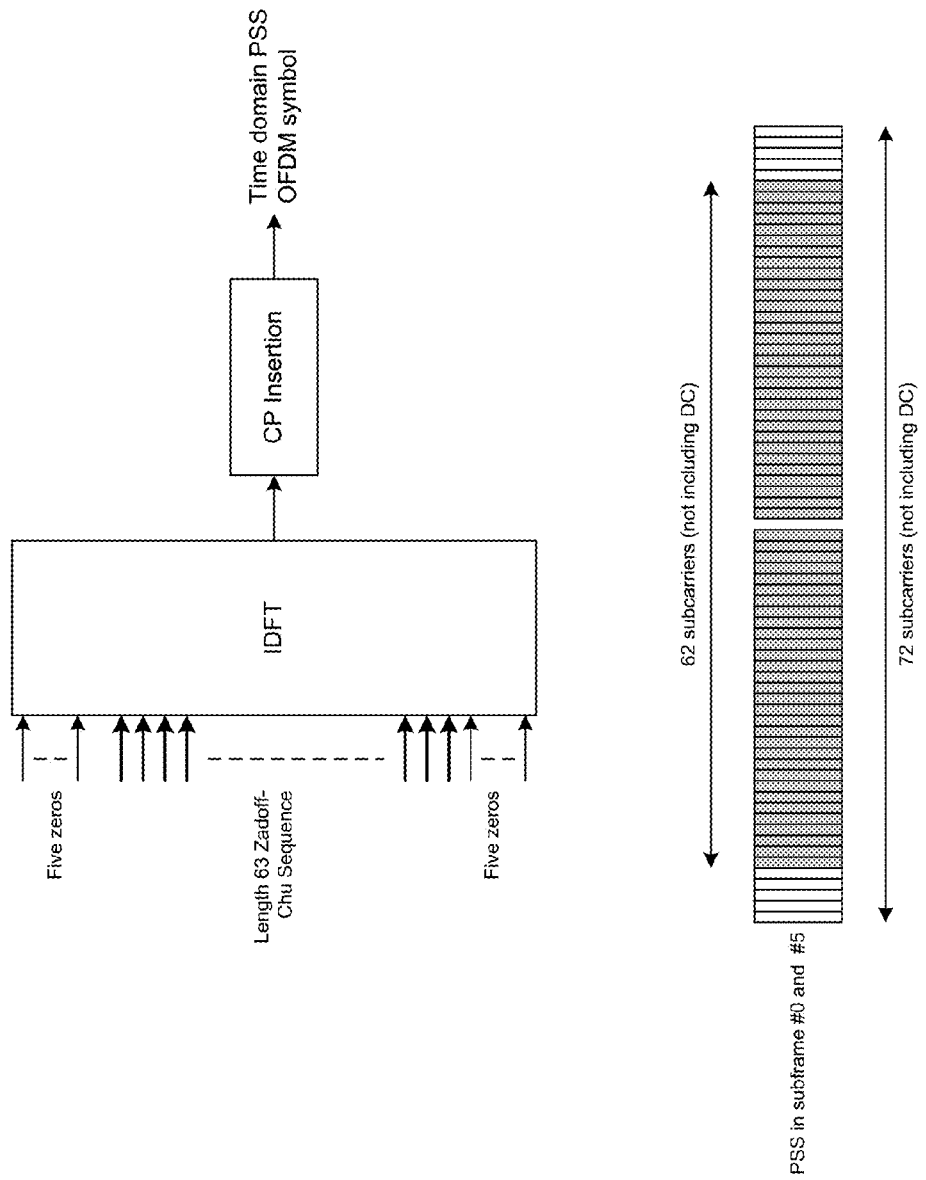
FIG. 10 illustrates PSS generation procedures for a 3GPP LTE wireless communication system.

The PSS sequence in frequency domain is a length 63 Zadoff-Chu sequence extended with five zeros on each side and mapped to central 72 sub-carriers as shown in FIG. 10. The Direct Current (DC) subcarrier is not used. In a 3GPP LTE wireless communication system, three different PSS sequences are used with Zadoff-Chu root indices 24, 29 and 34 corresponding to cell identity 0, 1 and 2 respectively within the physical cell identity group. The exact PSS sequences are defined in the 3GPP LTE specification TS 36.211 "Physical Channels and Modulation." The time domain PSS signal may be obtained by performing Inverse Discrete Fourier Transform (IDFT) of the frequency domain PSS. The two time domain PSS instances present within each 10 ms radio frame as shown in both FIG. 8 and FIG. 9 are identical.

Figure 11:
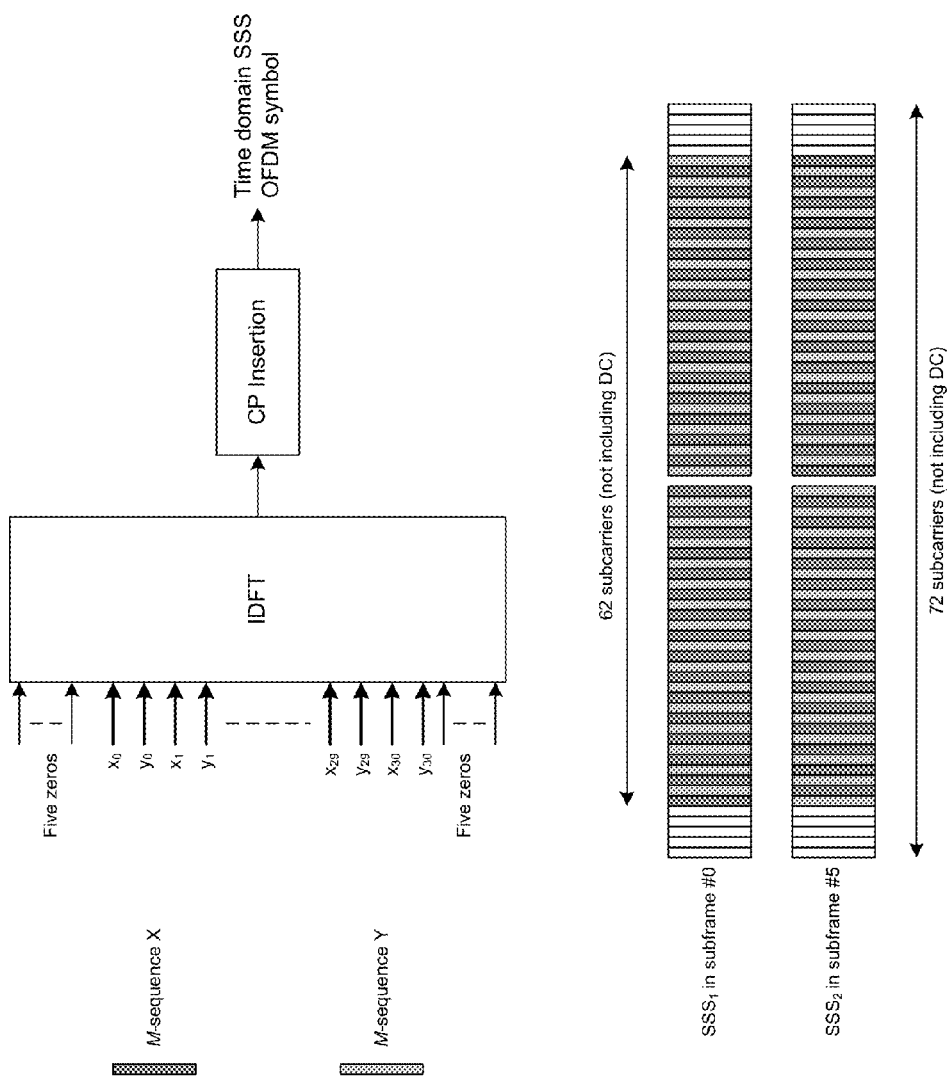
FIG. 11 illustrates SSS generation procedures for a 3GPP LTE wireless communication system.

The SSS sequences in frequency domain are generated by frequency interlacing of two length-31 M-sequences X and Y, each of which may take 31 different M-values. The SSS is extended with five zeros on each side and mapped to central 72 sub-carriers as shown in FIG. 11. The DC subcarrier is not used. In a 3GPP LTE wireless communication system, 168 valid combinations of X and Y are defined corresponding to 168 different physical cell identity groups. The time domain SSS signal may be obtained by performing IDFT of the frequency domain SSS. The two SSS sequences present in a 10 ms radio frame are different, namely $SSS_1$ and $SSS_2$ as shown in FIG. 8 and FIG. 9, which allows the client terminal to detect 10 ms radio frame timing from reception of a single SSS. The $SSS_1$ is transmitted in subframe-0 and the $SSS_2$ is transmitted in subframe-5 of each radio frame. When distinction between $SSS_1$ and $SSS_2$ is not required, they may be jointly referred as SSS. The only difference between $SSS_1$ and $SSS_2$ is that the two M-sequences X and Y used in $SSS_1$ are swapped in $SSS_2$. Relative timing between SSS and PSS depends upon CP type and duplexing type as shown in FIG. 8 and FIG. 9. Unlike the CP correlation, the PSS and SSS together uniquely identify a cell in a given geographic region. Therefore, any metrics derived from PSS and SSS may be able to differentiate signals from different cells.

According to an aspect of the present disclosure, a time domain local replica of the PSS of the serving cell may be generated and maintained in memory at the sampling rate of the incoming signal. For example, if the channel bandwidth of the current serving cell is 20 MHz, the sampling rate may be 30.72 Msps and the local replica of the PSS is generated at the sampling rate of 30.72 Msps. In another example, if the channel bandwidth of the current serving cell is 10 MHz, the sampling rate may be 15.36 Msps and the local replica of the PSS is generated at the sampling rate of 15.36 Msps. In yet another example, if the channel bandwidth of the current serving cell is 1.4 MHz, the sampling rate may be 1.92 Msps and the local replica of the PSS is generated at the sampling rate of 1.92 Msps. Similarly, time domain local replicas of the $SSS_1$ and $SSS_2$ of the serving cell may be generated and maintained in memory at the sampling rate of the incoming signal.

According to another aspect of the disclosure, the incoming signal is cross-correlated with the local replica of the PSS signal of the serving cell. Let the local replica of the PSS signal be denoted by p(n) and the incoming signal be denoted by z(n). The cross-correlation between these two signals is computed as follows:

$$R_{PSS}(n) = \left| \frac{1}{K} \sum_{k=0}^{k-1} z(n-k) \cdot p^*(K-k) \right| \quad (2)$$

where K is the length of the PSS local replica signal at the sampling rate on the incoming signal z(n).

Figure 12:
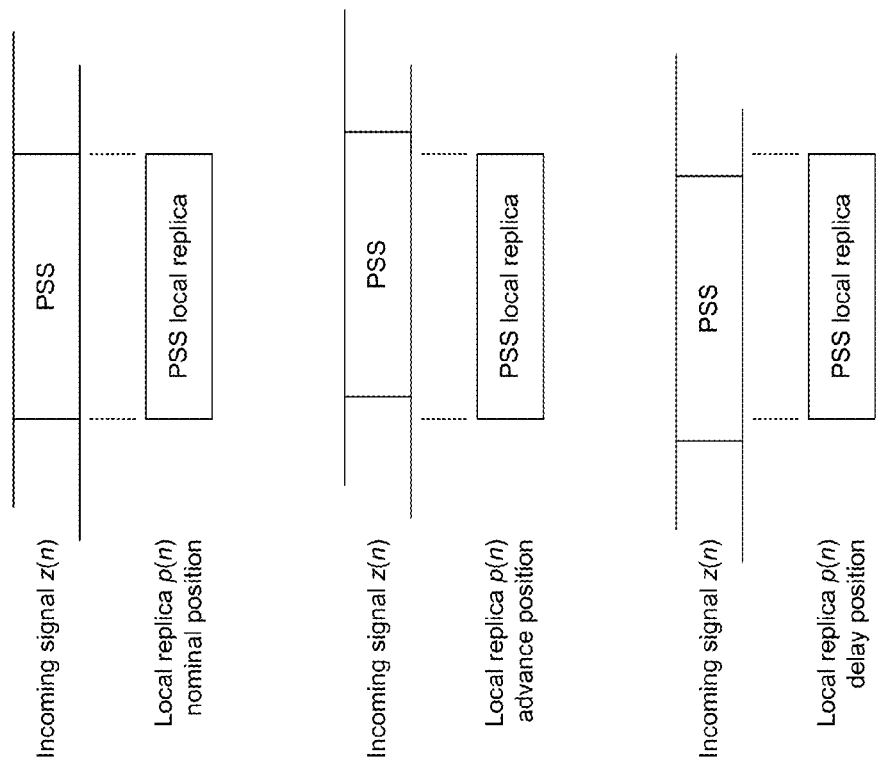
FIG. 12 illustrates different PSS positions around nominal for a PSS cross-correlation according to the aspects of the present disclosure.

According to another aspect of the disclosure, the cross correlation may be performed only around the expected position of the PSS in the incoming serving cell signal. Specifically, the PSS cross correlation with the local replica of the serving cell signal at the same sampling rate may be performed only during the time instant at which the PSS is transmitted by the serving cell base station. The specific time instances for PSS transmission are illustrated in FIG. 8 and FIG. 9. The timing error in the client terminal's timing with respect to the serving cell timing may vary and could be up to approximately half of the CP duration (approximately 5 µs for Normal CP). Therefore, the PSS cross-correlation with the incoming signal may be performed over approximately ±2.5 µs around the nominal expected position of the PSS as illustrated in FIG. 12.

According to another aspect of the disclosure, the incoming signal is cross-correlated with the local replica of the $SSS_1$ or $SSS_2$ signal of the serving cell.

Let the local replica of the $SSS_1$ and $SSS_2$ signal be denoted by $s_1(n)$ and $s_2(n)$ respectively. The cross-correlation between these local replicas and the incoming signal z(n) is computed as follows:

$$R_{SSS1}(n) = \left| \frac{1}{K} \sum_{k=0}^{k-1} z(n-k) \cdot s_1^*(K-k) \right| \quad (3)$$

and $$R_{SSS2}(n) = \left| \frac{1}{K} \sum_{k=0}^{k-1} z(n-k) \cdot s_2^*(K-k) \right| \quad (4)$$

where K is the length of the SSS local replica signals at the sampling rate on the incoming signal z(n).

According to another aspect of the disclosure, the cross-correlation may be performed only around the expected position of the $SSS_1$ or $SSS_2$ for the incoming serving cell signal. Specifically, the $SSS_1$ or $SSS_2$ cross-correlation with the local replica of the serving cell signal at the same sampling rate may be performed only during the time instant at which the $SSS_1$ or $SSS_2$ is transmitted by the serving cell base station. The specific time instances for $SSS_1$ and $SSS_2$ transmission are illustrated in FIG. 8 and FIG. 9. The $SSS_1$ or $SSS_2$ cross-correlation with the incoming signal may be performed over approximately ±2.5 µs around the nominal expected position of the $SSS_1$ or $SSS_2$.

According to another aspect of the present disclosure, the PSS cross-correlations and SSS cross-correlations may be combined to form a single set of correlation values for each time offset around nominal position for which cross-correlations are computed. According to another aspect of the present disclosure, the position of the maximum combined cross-correlation values may be used as the estimated true timing of the incoming signal. According to an aspect of the present disclosure, there may be one such timing position estimate obtained over a 5 ms interval as per the air interface of the 3GPP LTE wireless communication system. The timing position estimate obtained from multiple 5 ms intervals may be filtered, such as averaged, to find a more reliable estimate.

The PSS and SSS structures remain the same for all channel bandwidths and this allows the same timing offset estimation method to be used for all channel bandwidths. The PSS and SSS are constrained to be within the central 63 subcarriers of the signal regardless of the actual channel bandwidth used by a cell. According to an aspect of the present disclosure, the incoming signal is first filtered to retain only the central 63 subcarriers. This filters out the energy that may be present in the other subcarriers that may interfere with PSS and SSS cross-correlation. Since each subcarrier occupies 15 kHz, the total bandwidth for PSS and SSS signals is 63*15 kHz=945 kHz. Although the bandwidth of the PSS and SSS signals is constrained to be 945 kHz, the sampling rate of the signal after filtering may be retained to be the same as the original incoming signal. This enables the estimation of the timing offset in units of the incoming sampling rate. This in turn provides higher resolution in the estimated timing error. The PSS and SSS cross correlations may be computed over samples of an entire OFDM symbol which is much larger than the number of samples used in CP correlation. Therefore, the estimates using PSS and SSS cross-correlations may be more reliable.

According to an aspect of the present disclosure, in case of signals with lower channel bandwidth, the combined PSS and SSS cross-correlation metrics may be further interpolated to obtain higher granularity timing error estimate. For example, in case of a 1.4 MHz channel bandwidth and sampling rate of 1.92 Msps, the PSS and SSS cross-correlations may be obtained and combined at the sampling rate of the incoming signal, i.e., 1.92 Msps. After combining, the cross-correlated values may be interpolated using a 1-to-16 interpolation filter. Such interpolation filter may be designed using standard multi-rate filter design techniques such as described in P. P. Vaidyanathan, "Multirate Systems And Filter Banks," Prentice Hall (1993), pp. 120-125. The interpolation filter may be designed to meet the required timing error estimation granularity and complexity. If a lower complexity solution is required, the PSS and SSS cross-correlation may be performed at a lower sampling rate but with slightly reduced timing error estimation granularity. The interpolation filter may be different for each channel bandwidth and the desired timing error granularity. For example, for a 10 MHz channel bandwidth with a sampling rate of 15.36 Msps, a 1-to-2 interpolation filter may be used for a granularity of 30.72 Msps. In some cases, the interpolation filter may not be used. For example, in case of 20 MHz channel bandwidth, the incoming sampling rate is at the highest required timing error estimation granularity and the interpolation filter may not be required.

According to another aspect of the present disclosure, the filter to reduce bandwidth of the incoming signal to the central 945 kHz and the interpolation filter required to change the sample rate may be combined into a single filter. Such filters may be designed using standard multi-rate filter design techniques such as described in "Multirate Systems And Filter Banks" by P. P. Vaidyanathan, published by Prentice Hall (1993).

According to another aspect of the present disclosure, the PSS and SSS cross-correlation when receiving the normal downlink signal may be performed for every PSS and SSS occurrence or it may be performed on a need basis. For example, the PSS and SSS cross correlation may be performed once every 5 ms, 10 ms, 15 ms, 20 ms, etc. depending on the need for time tracking speed and accuracy.

Figure 13:
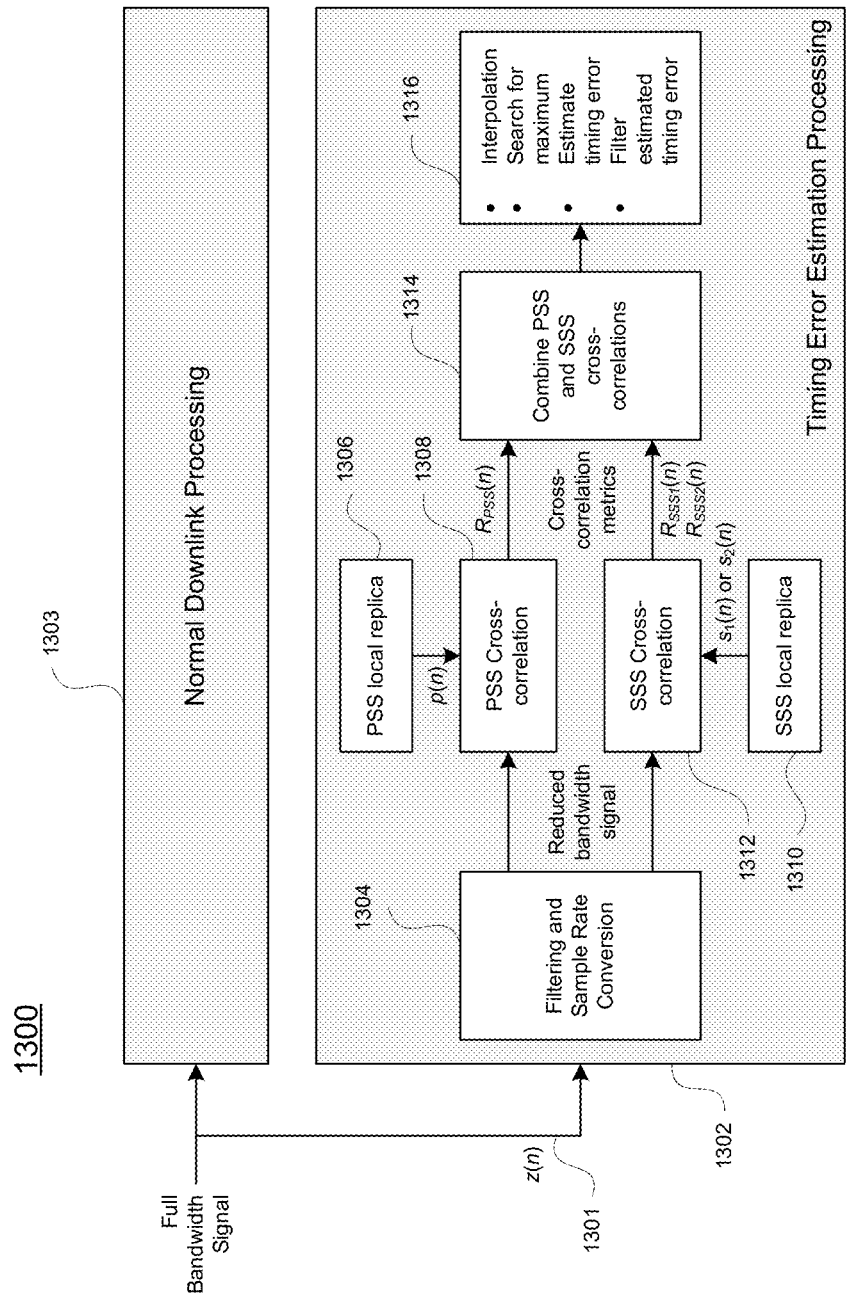
FIG. 13 illustrates a block diagram of the timing error estimation using PSS and SSS cross-correlations according to the aspects of the present disclosure.

The overall processing for timing error estimation using PSS and SSS according to the aspects of the present disclosure is illustrated in the block diagram 1300 in FIG. 13. The block diagram 1300 in FIG. 13 illustrates two main subsystems namely the Normal Downlink Processing block 1303 and the Timing Error Estimation Processing block 1302. The Timing Error Estimation Processing block 1302 performs the processing according to the aspects of the present disclosure and its internal processing is described in detail next. The received incoming signal z(n) 1301 is input to the Timing Error Estimation processing block 1302. The received incoming signal z(n) 1301 may be input to the Filtering and Sample Rate Conversion processing block 1304. The low pass filtering in processing block 1304 may only allow a reduced bandwidth corresponding to a central 945 kHz bandwidth, so as to extract a signal corresponding to the PSS and SSS bandwidth. The sampling rate of the filtered output signal may be reduced in the processing block 1304 depending on the operating bandwidth and sampling rate of the incoming signal and the required timing error estimation accuracy. The reduced bandwidth and possibly reduced sampling rate signal is then used for performing cross-correlation in the PSS Cross-correlation processing block 1308 using the PSS local replica from the block 1306. Similarly, the reduced bandwidth and possibly reduced sampling rate signal is used for performing cross-correlation in SSS Cross-correlation processing block 1312 using the SSS ($SSS_1$ or $SSS_2$) local replica from the block 1310. The cross-correlations output by the processing blocks 1312 and 1308 are combined in the processing block 1314. When the configurable number of such cross-correlations is combined, in processing block 1316, the combined cross-correlation values may be first interpolated if the higher timing error estimate resolution is required. Next the interpolated cross-correlation values may be searched for maximum and finally the timing error may be estimated from the position of the maximum. The estimated timing error may be further filtered, such as averaged, to obtain more reliable estimate.

By way of example only, the above-described method may be implemented in a receiver, e.g., a user device such as a wireless mobile station (MS) 12 as shown in FIG. 1.

Figure 14:
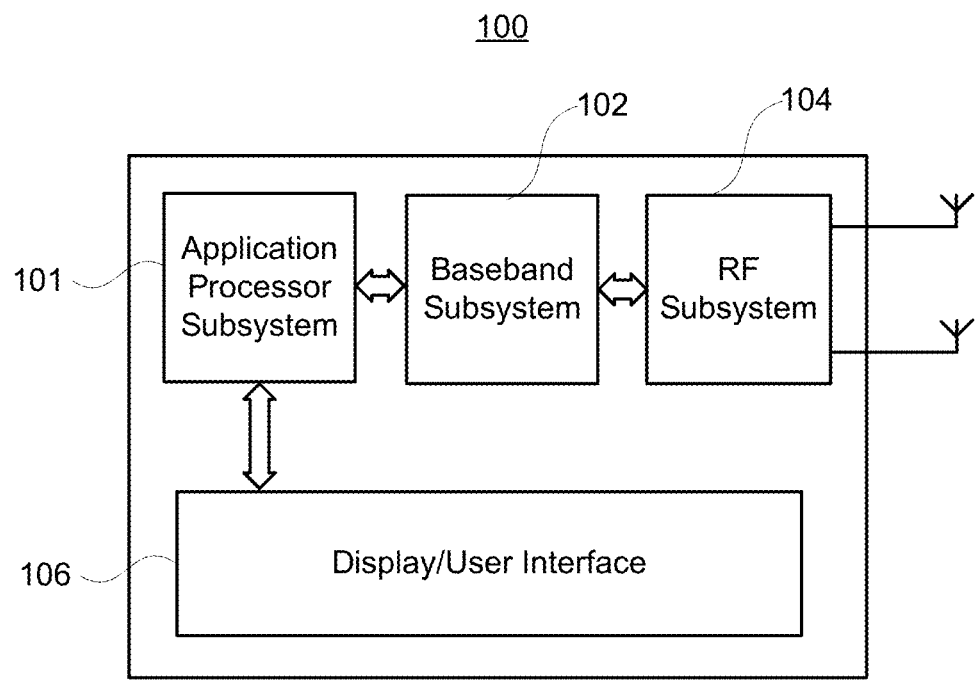
FIG. 14 illustrates a wireless mobile station diagram, which may be employed with aspects of the disclosure described herein.

As shown in FIG. 14, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 15:
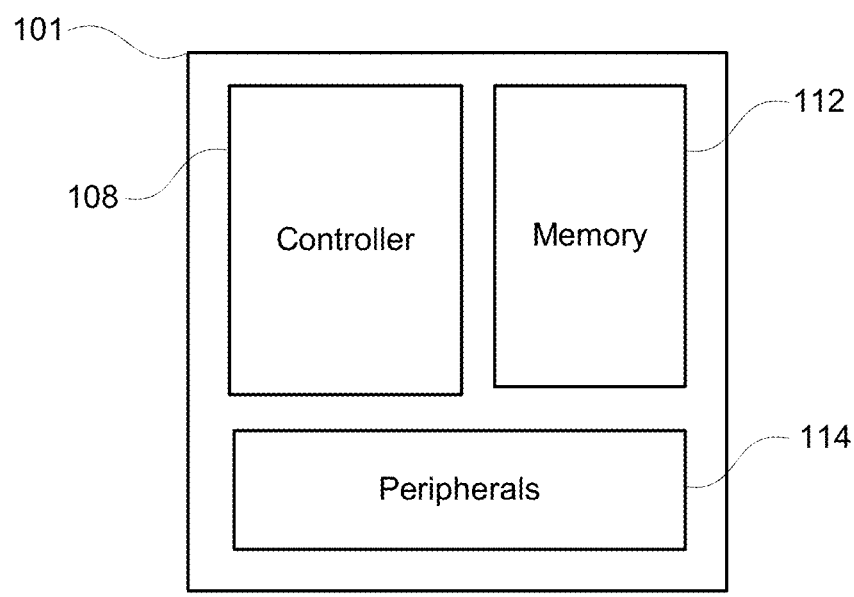
FIG. 15 illustrates an application processor subsystem for a wireless mobile station, which may be employed with aspects of the disclosure described herein.
Figure 16:
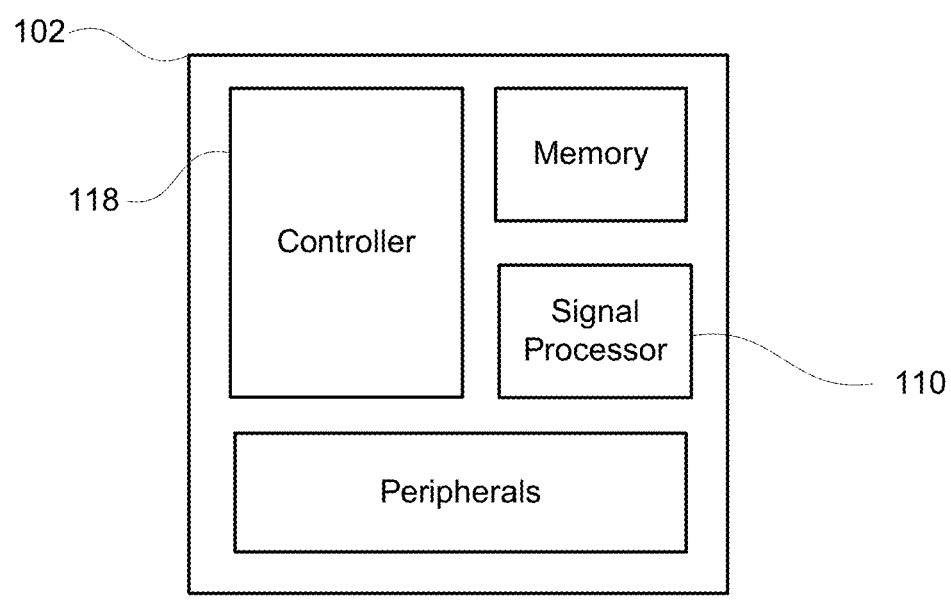
FIG. 16 illustrates a baseband subsystem for a wireless mobile station, which may be employed with aspects of the disclosure described herein.
Figure 17:
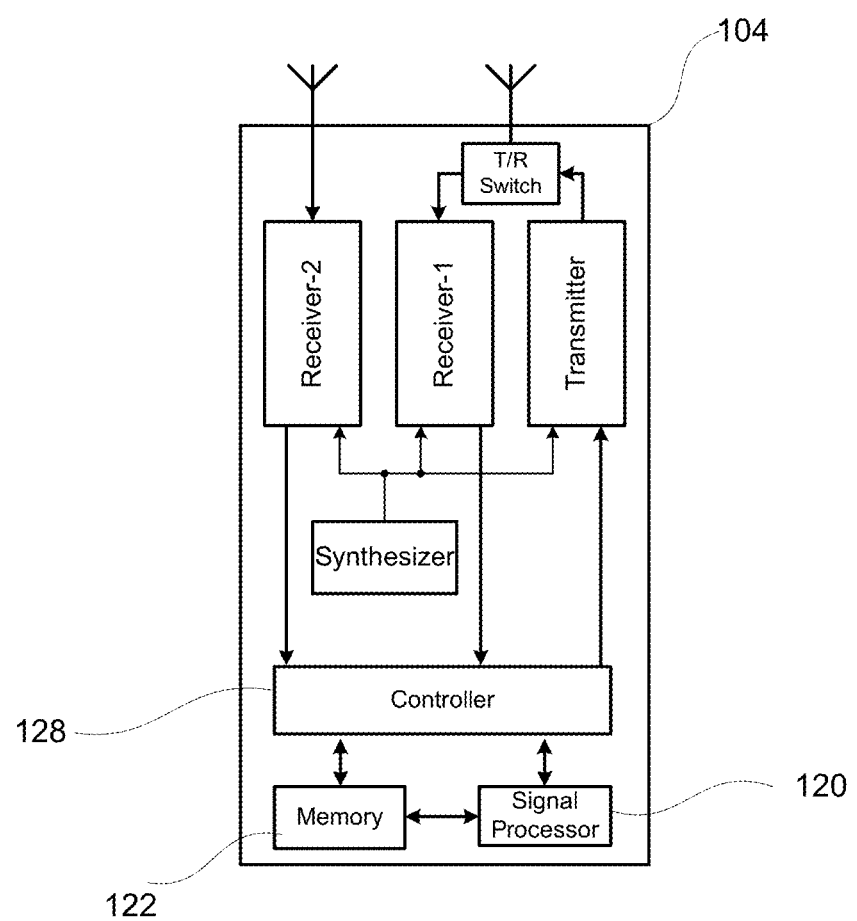
FIG. 17 illustrates a Radio Frequency (RF) subsystem for a wireless mobile station, which may be employed with aspects of the disclosure described herein.

The application processor subsystem 101 as shown in FIG. 15 may include a controller 108 such as a microcontroller, another processor or other circuitry. The baseband subsystem 102 as shown in FIG. 16 may include a controller 118 such as a microcontroller or other processor. The RF subsystem 104 as shown in FIG. 17 may include a controller 128 such as a microcontroller, another processor or other circuitry. The controller 108 desirably handles overall operation of the MS 100. This may be done by any combination of hardware, software and firmware running on the controller 108. Such a combination of hardware, software and firmware may embody any methods in accordance with aspects of the present disclosure.

Peripherals 114 such as a full or partial keyboard, video or still image display, audio interface, etc may be employed and managed through the controller 108.

Aspects of the present disclosure may be implemented in firmware of the controller 108 of the application processor and/or the controller 118 of the baseband subsystem. In another alternative, aspects of the present disclosure may also be implemented as a combination of firmware and hardware of the application processor subsystem 101 and/or the baseband subsystem 102. For instance, a signal processing entity of any or all of the FIG. 16 may be implemented in firmware, hardware and/or software. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use the aspects of the disclosure may include smartphones, tablets, laptops, gaming consoles, cameras, video camcorders, TV, car entertainment systems, etc.

Although aspects of the disclosure herein have been described with reference to particular embodiments, it is to be understood that these embodiments are merely illustrative of the principles and applications of the aspects of the present disclosure. It is therefore to be understood that numerous modifications may be made to the illustrative embodiments and that other arrangements may be devised without departing from the spirit and scope of the aspects of the present disclosure as defined by the appended claims. Aspects of each embodiment may be employed in the other embodiments described herein.

The invention claimed is:

1. A method for time tracking at a client device being served by a base station in an Orthogonal Frequency Division Multiplexing (OFDM) wireless communication system, the method comprising:
   controlling, by a processing device, for each of at least one interval of a received signal,
      filtering the received signal to obtain a filtered signal having a bandwidth corresponding to a predetermined central bandwidth,
      in which the filtered signal corresponds to a bandwidth of a Primary Synchronization Signal (PSS) and a bandwidth of a Secondary Synchronization Signal (SSS) of the received signal, and
      in which a sampling rate of the filtered signal is according to a bandwidth of the received signal, a sampling rate of the received signal and a predetermined estimation accuracy for timing error;
   first cross-correlation processing of the filtered signal and a time domain replica of the PSS of the serving base station having a sampling rate of the received signal, to obtain a first cross-correlation output signal;
   second cross-correlation processing of the filtered signal and a time domain replica of a SSS of the serving base station having the sampling rate of the received signal, to obtain a second cross-correlation output signal;
   combining the first and second cross-correlation output signals to obtain a plurality of combined cross-correlation values; and
   when the bandwidth of the received signal is not less than a predetermined bandwidth, estimating a timing error from a position of a maximum of the combined cross-correlation values, and
   when the bandwidth of the received signal is less than a predetermined bandwidth, performing interpolation on the combined cross-correlation values to obtain interpolated cross-correlation values and estimating the timing error from a position of a maximum of the combined cross-correlation values and the interpolated cross-correlation values.

2. The method of claim 1, wherein the time domain replica of the PSS and the time domain replica of the SSS are stored in a memory of the client device.

3. The method of claim 1, wherein the sampling rate of the filtered signal is less than the sampling rate of the received signal.

4. The method of claim 1, wherein the time domain replica of the SSS is a time domain replica of a first SSS or a time domain replica of a second SSS of the serving base station.

5. The method of claim 1, wherein the first cross-correlation processing of the filtered signal and the time domain replica of the PSS of the serving base station is performed only around an expected position of the PSS in the received signal for the serving base station.

6. The method of claim 5, wherein the first cross-correlation processing of the filtered signal and the time domain replica of the PSS of the serving base station is performed only at a time instant at which the PSS is transmitted by the serving base station.

7. The method of claim 1,
   wherein the second cross-correlation processing of the filtered signal and the time domain replica of the SSS of the serving base station is performed only around an expected position of the SSS for the serving base station, and wherein the time domain replica of the SSS is a time down replica of a first SSS or a time domain replica of a second SSS of the serving base station.

8. The method of claim 7,
   wherein the second cross-correlation processing of the filtered signal and the time domain replica of the SSS of the serving base station is performed only at a time instant at which the first SSS or the second SSS as the SSS is transmitted by the serving base station.

9. The method of claim 1, wherein the combined cross-correlation values include a single set of correlation values for each time offset around (i) a first nominal position for which the first cross-correlation processing of the filtered signal and the time domain replica of the PSS of the serving base station is performed and (ii) a second nominal position for which the second cross-correlation processing of the filtered signal and the time domain replica of the SSS of the serving base station is performed.

10. The method of claim 1, wherein the at least one interval is a 5 ms interval and the wireless communication system is a $3^{rd}$ Generation Partnership Project (3GPP) Long Term Evolution (LTE) wireless communication system.

11. The method of claim 1, wherein the at least one interval includes a plurality intervals, and
   the method further comprising:
   estimating a final timing error by determining an average of the timing errors estimated respectively for the plurality of intervals.

12. The method of claim 1,
   wherein the filtering of the received signal is to retain only sixty-three central subcarriers, and wherein the predetermined central bandwidth is 945 kHz.

13. The method of claim 1, wherein the sampling rate of the filtered signal is the same as the sampling rate of the received signal.

14. The method of claim 1,
wherein the interpolation is performed in accordance with the bandwidth of the received signal and a predetermined desired error granularity for the time tracking.

15. The method of claim 1, wherein the filtering of the received signal and the interpolation are performed by a single filter.

16. The method of claim 1, wherein the method is performed for each PSS and SSS occurrence in the received signal or based on a determination of need for speed and accuracy of the time tracking.

17. An apparatus for time tracking at a client device being served by a base station in an Orthogonal Frequency Division Multiplexing (OFDM) wireless communication system, the apparatus comprising:
circuitry configured to control, for each of at least one interval of a received signal,
filtering the received signal to obtain a filtered signal having a bandwidth corresponding to a predetermined central bandwidth,
in which the filtered signal corresponds to a bandwidth of a Primary Synchronization Signal (PSS) and a bandwidth of a Secondary Synchronization Signal (SSS) of the received signal, and
in which a sampling rate of the filtered signal is according to a bandwidth of the received signal, a sampling rate of the received signal and a predetermined estimation accuracy for timing error;
first cross-correlation processing of the filtered signal and a time domain replica of the PSS of the serving base station having a sampling rate of the received signal, to obtain a first cross-correlation output signal;
second cross-correlation processing of the filtered signal and a time domain replica of a SSS of the serving base station having the sampling rate of the received signal, to obtain a second cross-correlation output signal;
combining the first and second cross-correlation output signals to obtain a plurality of combined cross-correlation values; and
when the bandwidth of the received signal is not less than a predetermined bandwidth, estimating a timing error from a position of a maximum of the combined cross-correlation values, and
when the bandwidth of the received signal is less than a predetermined bandwidth, performing interpolation on the combined cross-correlation values to obtain interpolated cross-correlation values and estimating the timing error from a position of a maximum of the combined cross-correlation values and the interpolated cross-correlation values.

18. The apparatus of claim 17, wherein the first cross-correlation processing of the filtered signal and the time domain replica of the PSS of the serving base station is performed only around an expected position of the PSS in the received signal for the serving base station.

19. A communication device comprising:
a receiver to receive a signal; and
a processing device for time tracking at a client device being served by a base station in an Orthogonal Frequency Division Multiplexing (OFDM) wireless communication system,
wherein the processing device is configured to control, for each of at least one interval of a received signal,
filtering the received signal to obtain a filtered signal having a bandwidth corresponding to a predetermined central bandwidth,
in which the filtered signal corresponds to a bandwidth of a Primary Synchronization Signal (PSS) and a bandwidth of a Secondary Synchronization Signal (SSS) of the received signal, and
in which a sampling rate of the filtered signal is according to a bandwidth of the received signal, a sampling rate of the received signal and a predetermined estimation accuracy for timing error;
first cross-correlation processing of the filtered signal and a time domain replica of the PSS of the serving base station having a sampling rate of the received signal, to obtain a first cross-correlation output signal;
second cross-correlation processing of the filtered signal and a time domain replica of a SSS of the serving base station having the sampling rate of the received signal, to obtain a second cross-correlation output signal;
combining the first and second cross-correlation output signals to obtain a plurality of combined cross-correlation values; and
when the bandwidth of the received signal is not less than a predetermined bandwidth, estimating a timing error from a position of a maximum of the combined cross-correlation values, and
when the bandwidth of the received signal is less than a predetermined bandwidth, performing interpolation on the combined cross-correlation values to obtain interpolated cross-correlation values and estimating the timing error from a position of a maximum of the combined cross-correlation values and the interpolated cross-correlation values.

20. The communication device of claim 17, wherein the first cross-correlation processing of the filtered signal and the time domain replica of the PSS of the serving base station is performed only around an expected position of the PSS in the received signal for the serving base station.

* * * * *